United States Patent

[11] 3,620,498

| | | |
|---|---|---|
| [72] | Inventor | Julius Tunkl<br>Lincolnwood, Ill. |
| [21] | Appl. No. | 869,099 |
| [22] | Filed | Oct. 24, 1969 |
| [45] | Patented | Nov. 16, 1971 |
| [73] | Assignee | Tunkl Industries, Inc.<br>Lincolnwood, Ill. |

[54] INFORMATION SHEET HOLDER
5 Claims, 5 Drawing Figs.

[52] U.S. Cl. ................................................. 248/278,
35/62, 281/1
[51] Int. Cl. ................................................. B43l 5/02
[50] Field of Search ........................................ 248/447,
278, 279; 40/67; 35/26, 62; 24/67 (3), 67 (9), 67
(11); 108/150; 281/1, 15

[56] References Cited
UNITED STATES PATENTS

| | | | | |
|---|---|---|---|---|
| 2,410,447 | 11/1946 | Juran | | 35/26 |
| 2,526,070 | 10/1950 | Early | | 248/278 |
| 2,791,040 | 5/1957 | Santorelli | | 35/62 |
| 2,939,585 | 6/1960 | Burgin | | 248/278 |

*Primary Examiner*—J. Franklin Foss
*Attorney*—Mason, Kolehmainen, Rathburn & Wyss ABSTRACT: An information sheet holder for mounting on the control column of a vehicle, such as an aircraft, comprising a bracket having one end secured to the column and an opposite end spaced outwardly thereof, connector means is mounted adjacent the outer end of the bracket for pivotal movement about a first axis generally transverse of the column, and holder means including a planar portion is provided for supporting information sheets and the like and including a mounting means at one end for removably connecting the holder to the connector means and supporting the same for pivotal movement about an axis normal to the first transverse axis, whereby the planar portion may be pivoted to expose opposite sides thereof for viewing.

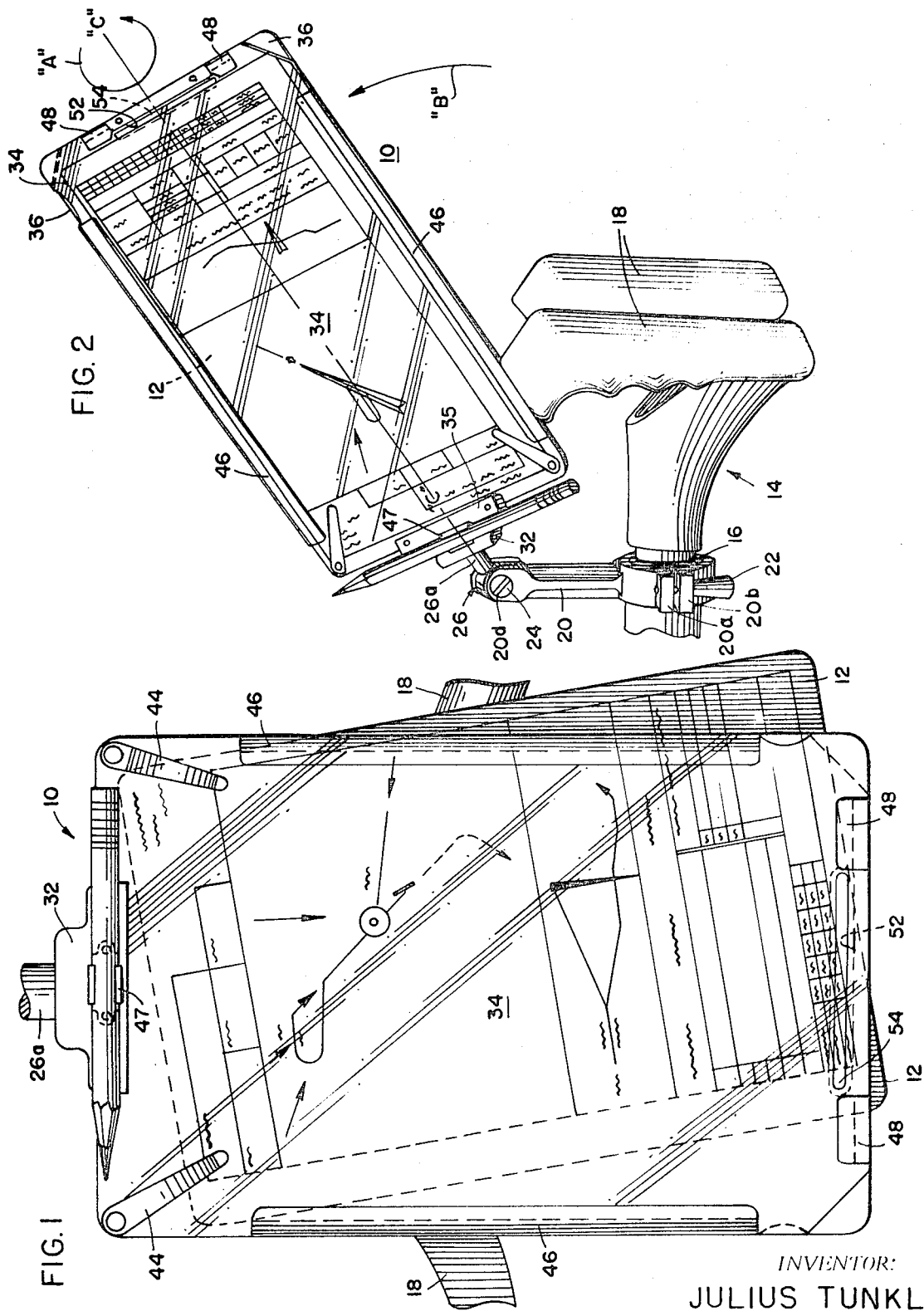

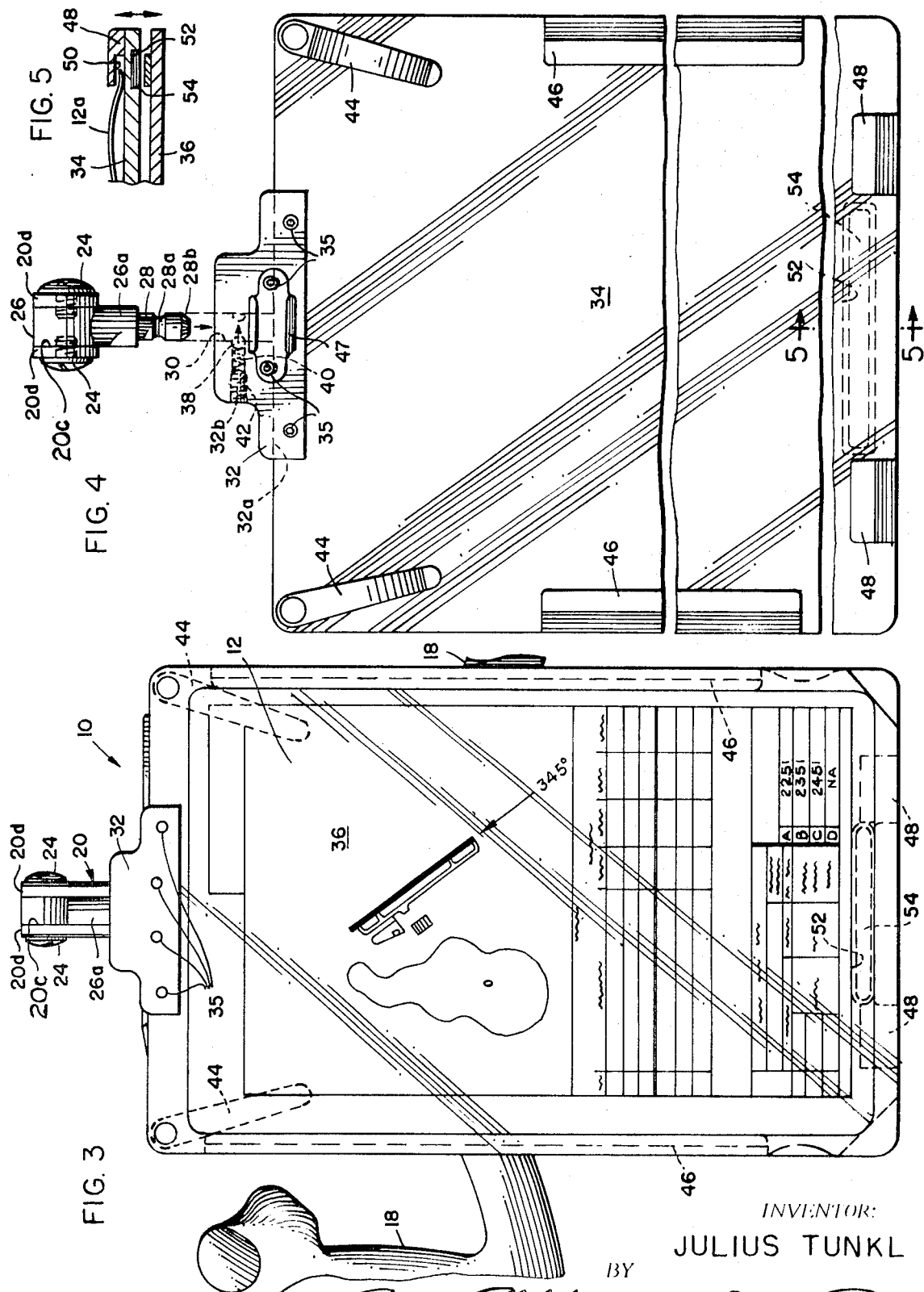

INFORMATION SHEET HOLDER

The present invention is directed to a new and improved information sheet holder especially adapted for mounting on the control column of a vehicle, such as an aircraft. The information holder of the present invention is especially handy and useful for pilots of aircraft when making instrument approaches and is adapted to hold airfield approach plates in a position adjacent the control column of the aircraft in clear and continuous view of the pilot while an approach is being made.

The information sheet holder includes a planar portion for holding an information sheet which is supported from its upper end portion in dependent fashion and is connected to the control column through a pair of pivot joints so as to permit the pilot to turn or flip over the device so that information on one or the other side can be continuously viewed. The approach plate holder is also readily detachable from its mounting and can be easily disconnected and reconnected if desired during an approach, with a minimum of trouble and manipulation.

It is an object of the present invention to provide a new and improved information sheet holder adapted for mounting on the control column of a vehicle, such as an aircraft.

It is an object of the present invention to provide a new and improved information sheet holder especially adapted for use with an aircraft having a ram's horn type control column, which holder permits the pilot to rapidly and easily flip or turn over the holder so that material on both sides may be readily viewed.

Another object of the present invention is to provide a new and improved information sheet holder including means whereby the holding device can be rapidly detached from and reconnected to the control column of the aircraft, if desired.

Another object of the invention is to provide a new and improved approach plate holder for aircraft which includes means for holding a writing instrument, "Jeppson" type navigator charts, maps, cross-country flight logs, clearance forms, etc., as well as approach plates and airport layout sheets.

These and other objects of the present invention are accomplished in an illustrated embodiment thereof comprising a bracket having one end adapted to be secured to the control column of an aircraft and an opposite end spaced outwardly thereof. Connector means is mounted adjacent the outer end of the bracket for pivotal movement about a first axis generally transverse of the column, and holder means including a planar portion for supporting information sheets and the like thereon is detachably connected to said connector means. Holder means includes a mounting means provided at one end of the planar portion for detachably connecting the holder means with the connector means. When connected, the folder means is freely pivotal on the connector means about an axis normal to said first axis, whereby the planar portion may be pivoted or turned so that the opposite side thereof is exposed for easy viewing by the pilot of the aircraft.

For a better understanding of the present invention, reference should be had to the following detailed description when taken in conjunction with the drawings, in which:

FIG. 1 is a front elevational view illustrating a new and improved information sheet holder constructed in accordance with the features of the present invention, and attached to a ram's horn type control column of an aircraft for viewing by the pilot;

FIG. 2 is a perspective view of the information sheet holder and the control column of FIG. 1, with the information holder shown in another operative position wherein the planar sheet holding portion is being turned or flipped over so that the back side may be viewed;

FIG. 3 is an elevational view of the back side of the approach plate holder as seen by the pilot, with reverse or back side displayed;

FIG. 4 is an elevational view of the sheet holder and its support pin connector in a disconnected condition; and FIG. 5 is a fragmentary, transverse, longitudinal, sectional view taken substantially along lines 5—5 of FIG. 4.

Referring now, more particularly, to the drawings, therein is illustrated a new and improved information sheet holder generally referred to by the reference numeral 10 (FIG. 2) and constructed in accordance with the features of the present invention. The holder 10 is especially adapted for displaying approach plates to the pilot of an aircraft, such as the printed approach plate 12 and is especially adapted for mounting upon the control column 14 of an aircraft or other vehicle. The holder 10 is suitable for use with a ram's horn type control column which includes an elongated shaft 16 extending outwardly from the instrument panel of the aircraft with a hand grip 18 resembling a ram's horn mounted on the outer end of the shaft. In many modern aircraft, the control column or yoke assembly is movable toward and away from the instrument panel of the craft, in a generally horizontal direction and is rotatable about the longitudinal axis of the shaft by the hand grip 18 at the outer end.

In accordance with the present invention, the approach information sheet holder 10 includes an upstanding bracket 20 (FIG. 2), which is similar in construction and appearance to a connecting rod of an internal combustion engine. The bracket 20 includes an enlarged lower end portion 20a having an opening therein substantially equal to the diameter of the shaft 16 of the control column assembly 14 and a cap portion 20b is provided to close and secure the lower end portion of the bracket on the shaft 16 for rotation therewith. Suitable threaded capscrews 22 are extended upwardly from the opposite end portions of the cap 20b into threaded apertures formed in the opposite ends of the lower end portion 20a of the bracket 20 which is thereby secured against relative rotation and longitudinal sliding movement on the shaft 16. The upper end of the bracket 20 is bifurcated as at 20c (FIG. 4) and is formed with a pair of upstanding, spaced-apart legs 20d, each having an aligned opening therein for receiving a removable capscrew 24 which is threaded into the cylindrical body portion of a swivel connector 26 disposed for free pivotal movement about an axis transverse to the longitudinal axis of the control shaft 16 within the bifurcated slot 20c in the upper end of the bracket 20.

The swivel connector 26 includes a connector pin 26a extending radially outwardly of the body and the axis of rotation of the swivel connector on the bracket 20. As shown in enlarged detail in FIG. 4, the pin portion 26a includes a shank 28 of reduced diameter having an annular groove 28a spaced intermediate its ends and a frustoconically tapered outer end portion 28b. The reduced diameter portion 28 of the pin connector is adapted to be detachably received in a cylindrical bore 30 formed in a headblock 32 of the approach plate holder.

The headblock 32 provides support for the upper end portion of a pair of top and bottom transparent planar sheets 34 and 36, respectively, which sheets are used for supporting the approach plate 12 or other pilotage information as desired. Preferably the approach plate 12 is sandwiched between the pair of transparent sheet holders 34 and 36 so that, as shown by the arrow "A" in FIG. 2, the sheet holding portion of the assembly can be flipped over or rotated 180° about the longitudinal axis C—C so that both the front side of the approach plate is seen through the sheet 34, as shown in FIG. 1, and, upon flipping over, the reverse side of the plate is seen through the sheet 36, as shown in FIG. 3.

Most approach plates in use today have information printed on the front side regarding the path of the aircraft relative to the airport and navigational aids (FIGS. 1 and 2), and on the back side is provided an enlarged layout of the airport proper and pertinent data relating thereto. During the first part of an instrument approach the pilot will be utilizing the information on the front side of the approach plate. After the aircraft has departed the final approach radio fix toward the airport, the information on the back side of the approach plate is useful in helping the pilot to recognize and line up with the runway for landing after breaking out of the clouds. The approach plate holder 10 permits the pilot to rapidly flip from the front side to the back side, as desired, during an approach with little or no effort, merely by grasping the lower end of the transparent sheets 34 and 36 and pivoting the sheet holder upwardly as indicated by the arrow "B" (FIG. 2) while at the same time flipping or rotating the holder about the longitudinal axis C—C from front to back and vice versa, as indicated by the arrow "A." Should the pilot miss the approach and not pick up the field in time to make a safe landing, the holder can be turned or flipped over to the front side so that the missed approach procedure depicted thereon may be flown prior to commencement of another approach. The use of transparent sheet holders 34 and 36, with the approach plate 12 sandwiched therebetween coupled with the double axis pivotal support of the sheet holders on the aircraft control column permits easy viewing of opposite sides of the approach plate with a minimum of manipulation.

The head portion 32 includes an elongated slot 32a in the lower edge portion for receiving upper end portions of the transparent sheets 34, 36, which are secured within the slot by suitable fastening means, such as rivets or setscrews 35.

In accordance with the present invention, the sheet holding portion of the approach plate holder comprising the head portion 32 and the pair of transparent sheet holders 34 and 36 is freely rotatable on the pin connector 26a while connected thereto and, in addition, is bodily detachable from the swivel member 26, as shown in FIG. 4. For this purpose, the upper portion of the head member 32 is formed with a passage 32b generally normal to and intersecting the bore 30 which normally receives the end portion 28 of the pin connector. A retainer ball 38 is mounted at the inner end of the passage 32b and is biased into the bore 30 to normally seat within the groove 28a of the connector pin 26a when the pin is fully inserted in the socket or bore 30. Engagement of the ball 38 in the groove 28a holds the pin within the socket and permits the sheet holder to be freely swiveled as described. The ball 38 is biased toward the groove 28a by a coil spring 40 mounted in the passage 32b and a setscrew 42 is threaded into the passage for adjustment of the biasing force.

In order that additional information and materials besides the approach plate 12 may be displayed on the approach plate holder 10, a pair of leaf spring holding clips 44 are secured by suitable fasteners adjacent the upper corners of the sheet members 34 and 36. Each spring clip includes a downwardly extending finger biased inwardly against the outer surface of a transparent sheet 34 or 36 so that a map, log, or other informational material can be readily clipped and held on the holder. In addition to the spring members, one or both transparent sheet members 34 or 36 may be provided with retaining guides 46 along opposite sides and similar retaining guides or clips 48 along the bottom edge. A transverse cross section of a guide 48 is bottom edge. A transverse cross section of a guide 48 is shown in FIG. 5, and it should be noted that the guides are preferably formed of clear plastic material and are cemented or otherwise attached to the sheet members 34 or 36. As shown in FIG. 5, each guide 46 or 48 includes a lip portion along the inwardly facing edge space above the outer surface of the adjacent sheet holder 34 or 36 to provide a recess or slot 50 for receiving and holding the edge of an information sheet, for example, the sheet 12a. The respective transparent sheet holders 34 and 36 are fastened together along the upper edge by the head member 32, fasteners, 34, and the fasteners supporting the spring clips 44; however, the lower end portion of the sheet holders may be spread apart, as shown in FIG. 5, to facilitate insertion or withdrawal of an approach plate 12 or other information sheet material. For added convenience, a pencil holding clip 47 is mounted on one or both faces of the head portion 28.

In order to prevent an inserted approach plate from dropping out from the bottom edge of the sheet holders 34 and 36 and to help lock the lower end portions of the sheet holders against one another one of the sheet holders 34 and 36 and to help lock the lower end portions of the sheet holders against one another, one of the sheet holders 34 or 36 is provided with a piece of magnetizable material 52 embedded adjacent the lower edge portion (FIG. 5), and the other holder is provided with a permanent magnet 54 adapted to attract the bar 52. The holder sheets are thus held together along the lower edge with magnetic force so that an approach plate inserted between the planar sheets 34 and 36 may not inadvertently slip out.

The information sheet holder 10, in accordance with the present invention, thus provides an extremely useful implement for a pilot or driver of a vehicle in that pertinent information is conveniently located immediately in front of him and thus can be readily viewed as the flight or travel progresses. The approach plate holder can be easily disconnected if desired by pulling downwardly on the sheet holders 34 and 36, should it be necessary or desirable for safety of flight, and once the sheet-holding subassembly has been disconnected from the swivel 26 it can be easily and rapidly mounted thereon or connected thereto. Both sides of an approach plate or information sheet can be readily placed in display simply and rapidly by turning over or pivoting the planar sheets about the longitudinal axis C—C on the connector pin 26a.

What is claimed as new and desired to be secured by Letters Patent of the United States is:

1. An information holder for mounting on the control column of an aircraft between control handles thereof, comprising a bracket having one end secured to said column and an opposite end spaced outwardly thereof, connector means mounted adjacent said outer end of said bracket for free pivotal movement about a first axis generally transverse of said column, and holder means including a planar portion for supporting information sheets, and the like, and including mounting means at one end of said planar portion for detachable connection with said connector means for supporting said holder means for free pivotal movement abut an axis normal to said first axis whereby said planar portion may be swiveled abut said normal axis to free axis whereby said planar portion may by said planar portion may be swiveled about said normal axis to expose opposite sides thereof for viewing and may pivot about said first axis with said connector means.

The information holder of claim 1 wherein said planar portion comprises a pair of transparent sheet means in juxtaposition on one another and secured together adjacent said one end, said sheet means movable apart from one another adjacent an opposite end in order to receive an information sheet therebetween for viewing from opposite sides through respective ones of said transparent sheet means when said holder means is pivoted on said connector means.

3. The information holder of claim 1 wherein said connector means and said holder means are detachably connected by pin and socket connector means providing pivotal movement about the axis of said pin means.

4. The information holder of claim 3 including spring biased retaining means normally operative to maintain said pin and socket connector means in a connected position.

5. The information holder of claim 1 wherein said bracket includes a bifurcated outer end portion and said connector means is pivotally supported in said bifurcation for limited movement between positions wherein said connector means engages stop surfaces on said bracket.

* * * * *